US008775659B2

(12) United States Patent
Lord et al.

(10) Patent No.: US 8,775,659 B2
(45) Date of Patent: *Jul. 8, 2014

(54) METHOD AND APPARATUS FOR ASSISTING WITH PLAYBACK OF REMOTELY STORED MEDIA FILES

(75) Inventors: Robert D. Lord, Santa Cruz, CA (US); Ian C. Rogers, Venice, CA (US)

(73) Assignee: Yahoo! Inc., Sunnyvale, CA (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/701,089

(22) Filed: Feb. 5, 2010

(65) Prior Publication Data

US 2010/0185729 A1    Jul. 22, 2010

Related U.S. Application Data

(63) Continuation of application No. 10/715,694, filed on Nov. 18, 2003, now Pat. No. 7,673,062.

(51) Int. Cl.
*G06F 15/16* (2006.01)

(52) U.S. Cl.
USPC ........... 709/231; 709/202; 709/203; 709/228; 709/229

(58) Field of Classification Search
USPC ..................... 709/202–203, 228–229, 231
See application file for complete search history.

(56) References Cited

U.S. PATENT DOCUMENTS

| | | | |
|---|---|---|---|
| 6,505,160 B1 | 1/2003 | Levy et al. | |
| 6,519,648 B1 * | 2/2003 | Eyal | 709/231 |
| 6,574,655 B1 * | 6/2003 | Libert et al. | 709/200 |
| 6,609,105 B2 | 8/2003 | Van Zoest et al. | |
| 6,728,729 B1 * | 4/2004 | Jawa et al. | 1/1 |
| 6,735,628 B2 | 5/2004 | Eyal | |
| 6,760,042 B2 * | 7/2004 | Zetts | 715/716 |
| 6,834,308 B1 * | 12/2004 | Ikezoye et al. | 709/231 |
| 6,990,497 B2 | 1/2006 | O'Rourke et al. | |
| 7,076,478 B2 | 7/2006 | O'Rourke et al. | |
| 7,089,309 B2 * | 8/2006 | Ramaley et al. | 709/226 |
| 7,143,288 B2 | 11/2006 | Pham et al. | |
| 7,281,034 B1 | 10/2007 | Eyal | |
| 7,333,957 B2 * | 2/2008 | Levy et al. | 705/58 |
| 7,353,236 B2 | 4/2008 | Stickler | |

(Continued)

OTHER PUBLICATIONS

U.S. Appl. No. 10/715,694, filed Nov. 18, 2003, 34 pages.

(Continued)

*Primary Examiner* — Alina N Boutah
(74) *Attorney, Agent, or Firm* — Berkeley Law & Technology Group, LLP

(57) ABSTRACT

A software based system for facilitating streaming of media files to a device over a wide area network (WAN) includes an agent process, an authentication process, a client services process and a client process. The agent process catalogs local media files and advises the authentication process of it's availability on the WAN and the address at which it may be contacted. The client process contacts the client services process to obtain, after authenticating with it, the WAN address of the agent process and contacts the agent process to receive information or meta-data describing the media files available for streaming. The client process obtains information for forming a URI or playlist, that it then passes to a media player to request the stream over the WAN. Alternately, the client process may direct the agent process to pass the URL to another client process on, for example, the same local area network.

31 Claims, 6 Drawing Sheets

(56) References Cited

U.S. PATENT DOCUMENTS

| | | | |
|---|---|---|---|
| 7,363,372 B2* | 4/2008 | Potenzone et al. | 709/225 |
| 7,451,229 B2 | 11/2008 | Klemets et al. | |
| 7,457,532 B2* | 11/2008 | Barde et al. | 386/126 |
| 7,590,711 B2 | 9/2009 | Lord et al. | |
| 7,673,062 B2 | 3/2010 | Lord et al. | |
| 2002/0013852 A1* | 1/2002 | Janik | 709/231 |
| 2002/0069218 A1* | 6/2002 | Sull et al. | 707/501.1 |
| 2002/0116476 A1* | 8/2002 | Eyal et al. | 709/219 |
| 2002/0120925 A1 | 8/2002 | Logan | |
| 2002/0138619 A1* | 9/2002 | Ramaley et al. | 709/226 |
| 2002/0161797 A1 | 10/2002 | Gallo et al. | |
| 2002/0178279 A1 | 11/2002 | Janik et al. | |
| 2003/0005152 A1 | 1/2003 | Diwan et al. | |
| 2003/0097443 A1* | 5/2003 | Gillett et al. | 709/225 |
| 2003/0174861 A1* | 9/2003 | Levy et al. | 382/100 |
| 2003/0193994 A1 | 10/2003 | Stickler | |
| 2003/0204613 A1 | 10/2003 | Hudson et al. | |
| 2003/0220781 A1 | 11/2003 | Salmonsen et al. | |
| 2003/0229900 A1 | 12/2003 | Reisman | |
| 2003/0236582 A1* | 12/2003 | Zamir et al. | 700/94 |
| 2003/0236912 A1 | 12/2003 | Klemets et al. | |
| 2004/0003101 A1 | 1/2004 | Roth et al. | |
| 2004/0019658 A1* | 1/2004 | Plastina et al. | 709/217 |
| 2004/0024688 A1* | 2/2004 | Bi et al. | 705/37 |
| 2004/0028388 A1* | 2/2004 | Kataoka et al. | 386/96 |
| 2004/0034711 A1 | 2/2004 | Hughes | |
| 2004/0078470 A1* | 4/2004 | Baumeister et al. | 709/227 |
| 2004/0254887 A1* | 12/2004 | Jacoby | 705/52 |
| 2004/0254958 A1 | 12/2004 | Volk | |
| 2005/0005289 A1* | 1/2005 | Adolph et al. | 725/32 |
| 2005/0102371 A1* | 5/2005 | Aksu | 709/217 |
| 2005/0138137 A1* | 6/2005 | Encarnacion et al. | 709/217 |
| 2005/0138179 A1* | 6/2005 | Encarnacion et al. | 709/227 |
| 2005/0267870 A1* | 12/2005 | Everett-Church et al. | 707/3 |
| 2005/0273514 A1 | 12/2005 | Milkey et al. | |
| 2007/0022156 A1* | 1/2007 | Grubbs | 709/203 |
| 2007/0033292 A1* | 2/2007 | Sull et al. | 709/238 |
| 2007/0044010 A1 | 2/2007 | Sull | |
| 2007/0180099 A1 | 8/2007 | Tsimelzon | |

OTHER PUBLICATIONS

U.S. Appl. No. 10/715,694: Non-Final Office Action, mailed Oct. 3, 2006, 12 pages.

U.S. Appl. No. 10/715,694: Response to non-final office action, mailed Jan. 3, 2007, 17 pages.

U.S. Appl. No. 10/715,694: Requirements for restriction/election, mailed Mar. 22, 2007, 6 pages.

U.S. Appl. No. 10/715,694: Response to restriction requirement, mailed Apr. 17, 2007, 10 pages.

U.S. Appl. No. 10/715,694: Final Office action, mailed Jul. 3, 2007, 12 pages.

U.S. Appl. No. 10/715,694: RCE, mailed Aug. 31, 2007, 12 pages.

U.S. Appl. No. 10/715,694: Advisory Action, mailed Sep. 21, 2007, 3 pages.

U.S. Appl. No. 10/715,694: RCE, mailed Oct. 3, 2007, 9 pages.

U.S. Appl. No. 10/715,694: Non-Final Office action, mailed Dec. 27, 2007, 12 pages.

U.S. Appl. No. 10/715,694: Office Action response, mailed Mar. 27, 2008, 10 pages.

U.S. Appl. No. 10/715,694: Non-Final Office action, mailed Jul. 3, 2008, 16 pages.

U.S. Appl. No. 10/715,694: Office Action response, mailed Oct. 2, 2008, 12 pages.

U.S. Appl. No. 10/715,694: Non-Final Office action, mailed Dec. 24, 2008, 15 pages.

U.S. Appl. No. 10/715,694: Office Action response, mailed Mar. 3, 2009, 12 pages.

U.S. Appl. No. 10/715,694: Final Office action, mailed Apr. 27, 2009, 14 pages.

U.S. Appl. No. 10/715,694: RCE, mailed Jul. 21, 2009, 12 pages.

U.S. Appl. No. 10/715,694: Notice of allowance, mailed Sep. 15, 2009, 4 pages.

U.S. Appl. No. 10/715,694: RCE, mailed Nov. 12, 2009, 5 pages.

U.S. Appl. No. 10/715,694: Notice of allowance, mailed Dec. 1, 2009, 8 pages.

U.S. Appl. No. 10/715,694: Issue fee payment, mailed Jan. 13, 2010, 6 pages.

U.S. Appl. No. 10/715,694: Issue notification, mailed Feb. 10, 2010, 1 page.

U.S. Appl. No. 11/787,581, filed on Apr. 17, 2007, 48 pages.

U.S. Appl. No. 11/787,581: Filing receipt, mailed May 10, 2007, 3 pages.

U.S. Appl. No. 11/787,581: Notice of informal application, mailed May 10, 2007, 2 pages.

U.S. Appl. No. 11/787,581: Notice of publication, mailed Aug. 17, 2007, 1 page.

U.S. Appl. No. 11/787,581: Non-Final Office Action, mailed Jun. 26, 2008, 7 pages.

U.S. Appl. No. 11/787,581: Amendment, mailed Aug. 28, 2008, 6 pages.

U.S. Appl. No. 11/787,581: Interview request, mailed Oct. 10, 2008, 2 pages.

U.S. Appl. No. 11/787,581: Non-Final Office Action, mailed Nov. 19, 2008, 8 pages.

U.S. Appl. No. 11/787,581: Amendment, mailed Feb. 19, 2009, 7 pages.

U.S. Appl. No. 11/787,581: Notice of allowance, mailed Jun. 11, 2009, 10 pages.

U.S. Appl. No. 11/787,581: Issue Fee payment, mailed Aug. 5, 2009, 3 pages.

U.S. Appl. No. 11/787,581: Issue Notification, mailed Aug. 26, 2009, 1 page.

PCT/US2004/037835: Application as published on Jun. 2, 2005, 26 pages.

PCT/US2004/037835: International search report, mailed Jan. 3, 2007, 2 pages.

PCT/US2004/037835: Written opinion of the ISA, mailed Jan. 3, 2007, 5 pages.

PCT/US2004/037835: International preliminary report on patentability, mailed Jan. 23, 2007, 6 pages.

\* cited by examiner

METHOD AND APPARATUS FOR ASSISTING WITH PLAYBACK OF REMOTELY STORED MEDIA FILES

This application is a continuation of application Ser. No. 10/715,694, filed Nov. 18, 2003 now U.S. Pat. No. 7,673,062, the contents of which are incorporated herein by reference.

BACKGROUND AND SUMMARY OF INVENTION

For various reasons, people are increasingly storing music, video and other types of so-called "media files" or "content" in digital form on their computers. Their computers have become virtual warehouses for their personal collections of music and video, with collections sometimes being distributed over several computers and data storage devices.

Once moved to computers, however, the availability of music and other media content away from the computer becomes an issue. Those who want access to their media files away from their computers typically duplicate some or all of the files back onto portable media, such as compact discs, flash memory, and portable hard drives for playback on other devices, or portable playback devices such as "MP3 players". Managing all of these copies and other devices then becomes a problem.

Another option is to make files stored on a computer available for remote access through networks. However, setting up a computer for remote access over a local network, much less over a wide area, public network such as the Internet, requires specialized knowledge and skills that most computer users do not possess. It also presents rights-management issues. Furthermore, the use of private network addresses on local area networks, dynamically assigned public network addresses, and other security-related practices present additional problems.

SUMMARY OF THE INVENTION

Various aspects of the invention address one or more of these problems. The various aspects of the invention and their advantages are explained below using examples of processes running on networked computers that embody various aspects of the invention in their preferred form. However, the invention is defined by the appended claims and not limited to these examples.

DETAILED DESCRIPTION

The examples illustrated in the accompanying drawings involve software-controlled processes that undertake certain functions. The processes are preferably implemented by one or more microprocessors or similar devices executing software instructions stored in memory or on some other type of physical media from which the instructions can be read, either directly or indirectly, by the processing device. However, the processes could be implemented using any combination of software, firmware and hardware. The microprocessor could, for example, be part of a general-purpose computer, a "personal digital assistant", a cellular telephone, or other type of device. The processes could be, in some circumstances, distributed, meaning they could be executing on multiple processors in different address spaces.

Figure 1:
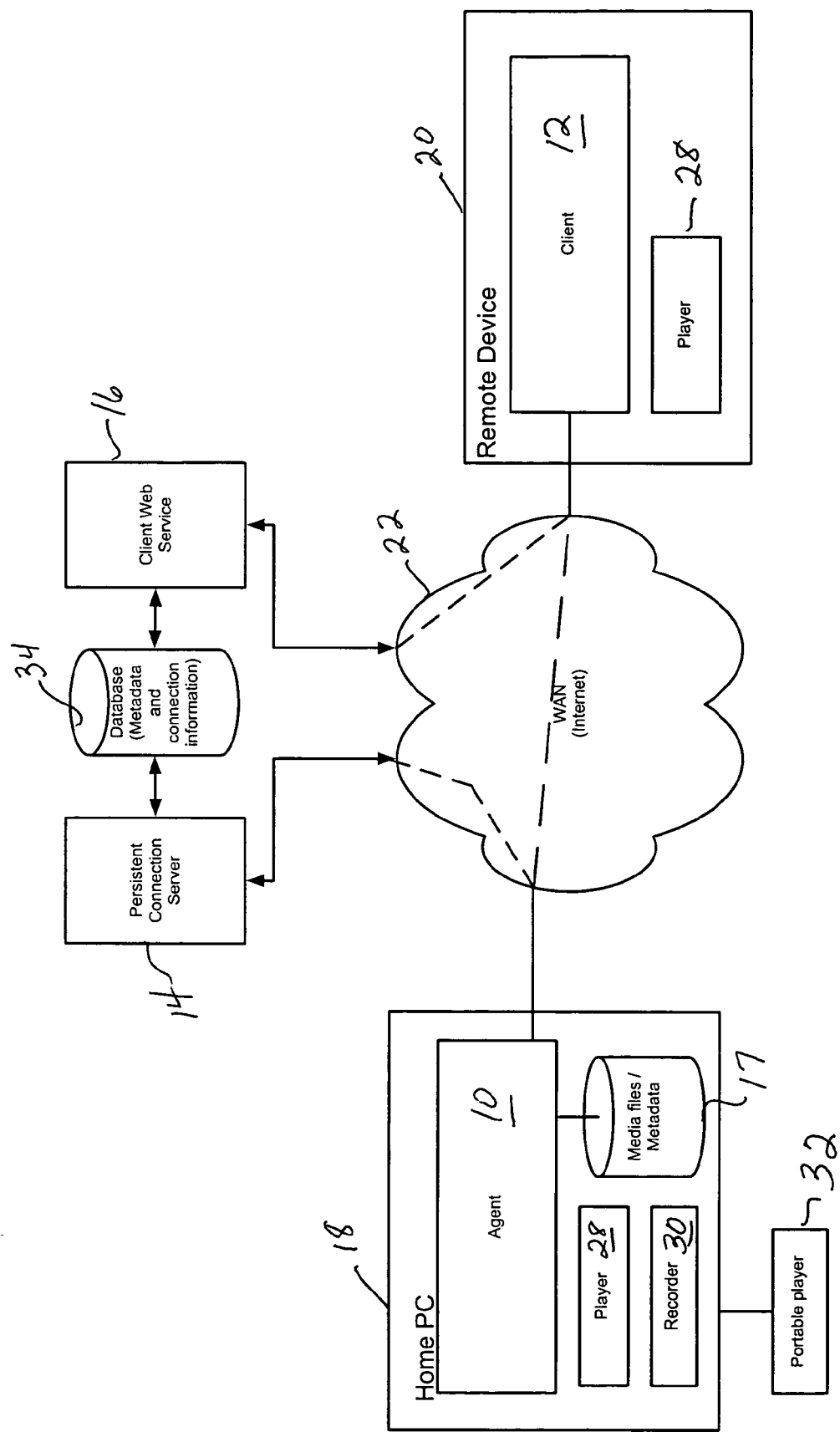
FIG. 1 is a block schematic representation of a first exemplary configuration of a network having processes for enabling playback of media files.
Figure 2:
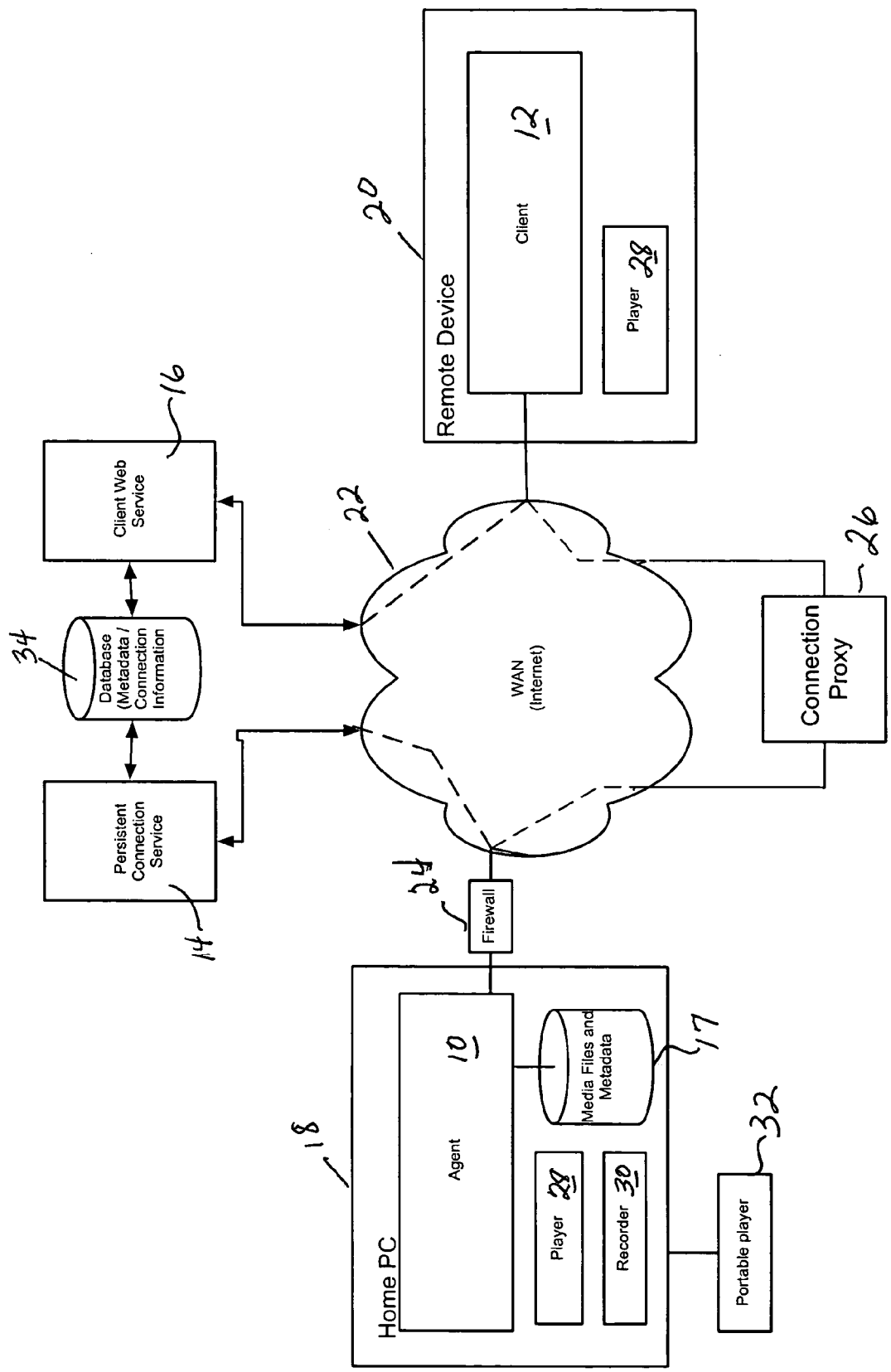
FIG. 2 is a block schematic representation of a first exemplary configuration of a network having processes for enabling playback of media content files stored on remote devices.

Referring to FIGS. 1 and 2, there are four basic processes in the illustrated examples: an agent process 10; a client process 12; a persistent connection service (PCS) process 14; and a client web services process 16. In the examples, each of these processes logically represents a collection of sub-processes that, in the examples, take place on the same device. However, the sub-processes need not, at least in some cases, be available or performed on the same device. Furthermore, multiple instances of each process may run on the same or on multiple devices. Agent process 10 runs on devices that stored one or more media content files 17, such as audio and video files. Client process 12 runs on devices that are used to playback media files that are streamed from agent processes. The PCS process runs on a device connected (in a logical or communications sense, not a literal sense) to a WAN—the Internet, for example—so that it can communicate with any agent process that has a connection to the WAN and provide to it services. The client web services process also runs on a device connected to the WAN so that client processes having access to the WAN may communicate with it to request and receive services.

Turning to the details of each of the examples, FIG. 1 illustrates a simple example involving an agent that has a direct connection to a wide area network (WAN) such as the Internet. One instance of agent process 10 is running on home personal computer 18, and one instance of client process 12 is running on a remote device 20, which could be, for example, a personal computer at a user's office. The home computer is an example of a device that can run an agent process. Other examples include portable media players, cable or television set-top boxes, personal video recorders, and the like. Instances of the PCS service process 14 and web services process 16 are running on one or more computers connected to WAN 22. In the particular example of FIG. 1, each device running a process (except for the client process) has assigned to it a public address on the WAN, for example, a public IP address. Therefore, client process 12 can initiate a connection with agent process 10 over the WAN using the public IP address of computer 18. The agent process need not make the connection.

In FIG. 2, however, home personal computer 18 is connected to WAN 22 through "firewall" 24. A firewall is a computer program running on the computer or hardware device which prevents a connection to the computer that is initiated from the other side of the firewall. A router that performs network address translation (NAT) can act as a firewall, for example. NAT replaces a public IP address and port number of all incoming packet with internal address and port number for routing the packet on a local area network. It performs the reverse for outgoing packets. In order to permit clients on devices outside the firewall to access servers running on a computer inside the firewall, the firewall must be configured to permit the client to initiate or request a connection. Typically, this involves opening a "port" through which a connection can be made to a particular process and, optionally, specifying a particular device on the LAN to which a connection on that port is to be routed.

However, many computer users either do not know how, should not attempt because of security risks, or are not permitted by network administrators to configure firewalls or network routers to allow certain services to be made available to clients outside of a firewall. In order to permit a client process 12 outside of a firewall to connect to a service inside a firewall (using, for example, a connection oriented protocol such as TCP) without opening ports in the firewall or performing any additional configuration of a router, an agent process may, at its option, use what will be referred to as "connection" proxy server 26 to enable client processes on the WAN to connect to it. In this illustrated example, this server is available on WAN 22. The server, which is a process running on, for example, allows clients to make a connection to it over the WAN and establish a communications channel that acts as a tunnel, in effect, through a firewall and allows agent processes 10 behind firewalls to receive connections from clients over a WAN. To use it, an agent process 10 connects to connection proxy server 26. Once the agent process authenticates with the proxy server, the connection proxy server assigns to the agent process a unique identifier that identifies the connection between the agent process and the connection proxy server. This unique identifier is then sent by the agent process to the PCS process, along with the address of the proxy server, if not already known. Client processes outside the firewall wanting to connect to the agent process connect to the connection proxy server at the server's IP address, using a port that the client process would normally use to connect to all agent process, and the unique identifier. The client process would thus construct, for example, a URI containing the WAN access of the proxy server, the designated port number (e.g., port 80), a file name or other designator for the file to be streamed, the unique identifier assigned to the agent process, and a session ID to validate playback. The connection proxy server uses the unique agent process identifier to identify the agent process and then forward or relay packets over from the client process to the agent process over the pre-established connection with the agent process. The connection proxy server 26 may also, if desired, be used to forward packets from the agent process to the client process using the session identifier to identify the already established connection to the client process.

When the connection between an agent process and the proxy server is lost, the unique identifier is lost, since it is assigned by the proxy server with each connection. Loss of the connection between the agent process and the proxy server during playback, therefore can create substantial interruption. The agent process has to reconnect to the connection proxy server, obtain a new identifier, and inform the PCS process of the new connection information. The client process then needs to go through the process of obtaining the connection information from the client web services process and restart the connection to the connection proxy. This entire reconnection process can take a substantial amount of time. An alternate method of assigning the unique agent identifier is to have the agent process generate it or otherwise provide it to the proxy server during each connection. Therefore, when a connection between the agent process and the client process is lost, all that must be done is to restart or reestablish the connection.

Referring again to FIGS. 1 and 2, each device, e.g., home personal computer 18 and remote device 20, also has a media player 28, which is used to playback media files that are stored on the device, stored on another connected device, and/or streamed to it. In the given example, home personal computer 18 also, optionally, has a recorder 30 for creating files from other media or in other formats, such as compact discs, for playback by players 28. Typically, the files stored on a computing device such as home personal computer 18 are compressed using, for example, MPEG 2 layer 3 compression. The recorder performs the compression. Home personal computer 18 also has, in these examples, a portable player 32 connected to it, such as through a serial, parallel, USB or "Firewire" port, on which media files may be stored.

Figure 3:
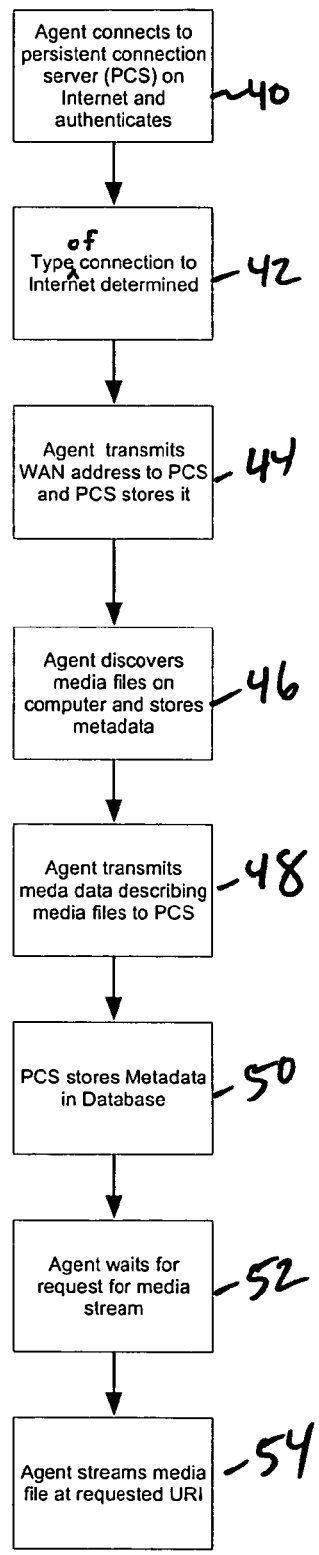
FIG. 3 is a flow diagram of exemplary steps of a first embodiment of an agent process.

FIG. 3 illustrates the basic steps of the operation of agent process 12 within the context of the exemplary networks of FIGS. 1 and 2. In these examples, the agent process collects and makes available information about media files stored on the host device. The information the agent process collects will also be called metadata, and might include, for example, title, artist, track and album information of a music file. The agent process may optionally also collect metadata on files stored on other devices connected directly to the device, such as external drives and portable media players connected to a personal computer. The collected metadata is stored on the host device in, for example, some type of database or file. In examples of FIGS. 1 and 2, this metadata is uploaded and stored in database 34 so that authorized clients can access it through client web service 16. Database 34 is intended only to be representative of one or more data stores available to the PCS process 14 and/or the client web services processes 16. Agent processes 10 may, however, be configured to provide the metadata to client processes directly, as described below in connection with FIG. 6. The agent process also acts as a streaming server to stream a file in response to a request for the stream.

The agent process is, like the client, PCS and web services processes, intended to be generally representative of a collection of functions or services preferably implemented using a complete program running on the same device. Implementing the agent process, alone or also with client process, as a single program or related programs simplifies installation and set up for a user and avoids complexities of separate implementations. However, it could be desirable to distribute these processes, implement the various functions in separate processes, and/or eliminate, modify, replace, or add functions to these processes.

Turning to FIG. 3, with further reference to FIGS. 1 and 2, when agent process 12 starts up, it connects at step 40 to an instance of the PCS process 14 that is available on WAN 22. The agent process then authenticates itself using, for example, a user or account name and a password. The agent process, with the assistance of the PCS process, then determines at step 42 what type of connection the agent has to the WAN. The type of connection determines how an instance of a client process 12 may initiate to the agent process over a WAN, or whether a connection can be even made. This step is detailed in FIG. 4, which will be described below. Step 42 may be performed out of order anytime after that agent process connects to the PCS process or concurrently with other processes and repeated as necessary or desirable.

If it is determined at step 42 that a connection can be made to the agent (other than one initiated by the agent), the agent process transmits at step 44 a WAN address to the PCS process. This address is the one determined during step 42 and is the WAN address at which a client process may contact the agent process over the WAN for services. The step may be repeated as necessary or desirable to update or change the address, and may be performed out of order or concurrently with other steps.

At step 46, the agent process goes through a discovery or cataloging sub-process. This sub-process involves searching or scanning the host device (or specified directories on the host device) and, optionally, any connected devices, for media files. Media files may be recognized by, for example, a particular file extension. Metadata describing the content of a media file—for example, title of the work, artist, composer, album, and genre for music files—may be contained in a tag with the file. One example of a tag is an MP3 tag. The meta data might also consist of, or be extracted from, path and/or file names. For example, media files may be stored in a series of subdirectories with names corresponding to the names of artists and albums. For example, the path and file name may serve initially as meta data for a file for display to a user. The user may then optionally edit the meta data into predefined fields. Otherwise, a portion of the media file can be read and matched against a preprogrammed database. Access to such databases are typically offered through on-line services available over the Internet. Collected metadata is placed in a file or database that along with information specifying the media file's location (e.g., device, volume, path and file name). In a preferred embodiment, this metadata is tagged using XML. This database forms, in essence, a type of catalog of the collection of media files on the host device and, optionally, connected devices. In each case, it is preferred that user be able to edit the meta data in the database. Step 60 can be repeated at anytime to update the metadata information to include metadata for newly found or added media files, to delete metadata for files that are deleted, or to edit it.

With steps 48 and 50, the agent process transmits to the PCS process the metadata, preferably tagged using XML, and the PCS process stores it in database 34. This metadata is linked to a particular account or user and forms part of what, in essence, can be thought of as a larger catalog of all the media files that a particular user may have on any number of devices, not just the host device and the devices connected to it or available to it during discovery step 46. These steps may be repeated at anytime to update the metadata stored in database 34 with changes to the metadata made by the agent process.

As indicated by steps 52 and 54, the agent process waits for a request for a media file from a media player and, in response to receiving such a request, transmits the requested media file as a stream to the media player requesting the media file. This request will specify the media file using, for example, a uniform resource indicator (URI) that identifies a media file to be streamed to a client process that is located at an address, either WAN or local, and a port. In a preferred embodiment, the agent process includes a web or http server process and a streaming server process that are used to receive and respond to a request for an audio and/or video stream. The agent process may be set up to stream only one media file at a time to one address and may also include some type of authentication mechanism to ensure that only authorized users receive the stream.

Figure 4:
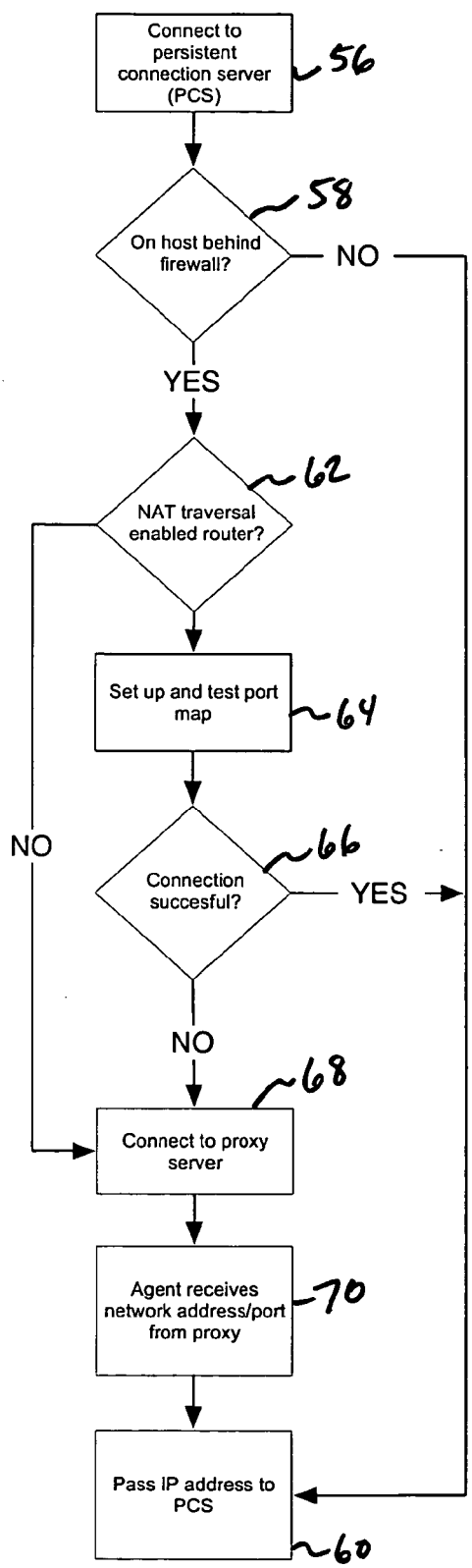
FIG. 4 is a flow diagram of a exemplary steps of a process for discovering whether an agent process can be connected to over a WAN and setting up a connection.

FIG. 4 illustrates a representative example the basic steps that an agent process 10 undertakes to determine whether it has a connection to the WAN and, if so, what type or types of connection it has. Once determined, it then configures the connection to allow client processes to request services using, for example, a TCP-based session or similar type of connection to a public address on the WAN (e.g., a public IP address). This address is made available to client processes, preferably only those that are authorized to connect to the particular agent process.

Once connected to a PCS server at step 56, the agent process attempts at step 58 to determine whether it is communicating with PCS server through a firewall or a router employing network address translation (NAT). This is determined by, for example, checking the host device's network address against, for example, a known range of addresses reserved solely for use as private addresses on local networks or the network address that PCS process is using to communicate with the agent address. In the later case, the agent process requests the PCS process to identify to the address, with which it is communicating. If it is not the same as the IP address assigned to host device, or the address can only be a local address, the agent process concludes it is behind a firewall. Otherwise, it sends at step 60 its host device's network address to the PCS server as its WAN address.

At step 62, the process attempts to discover whether the gateway router with which it is connected provides NAT traversal services such as, for example, Universal Plug 'n Play (UPnP) "NAT Traversal." It may discover this service using a network auto-configuration protocol like UPnP or Apple's "Rendezvous," Apple Computer's "Rendezvous" implementation of the Internet Engineering Task Force's Zero Configuration Networking (zeroconf) recommendations. If the service is available, it requests the public IP address of the gateway and a port mapping. It then passes the IP address and assigned port to the PCS process, which then attempts to connect to agent process to test the connection. If the connection works, the agent process jumps to step 60.

If automated NAT traversal is not available, the agent process then sets up at steps 68 and 70 a connection with a proxy gateway on the WAN, such as connection proxy 26 shown in FIG. 2. When the connection is made, the proxy assigns to the connection a public or routable WAN address and port number. The WAN address and port number to connect with the agent process is passed back to the PCS process at step 60. Although not illustrated, NAT traversal could be manually configured and the agent process could be provided the WAN address and port number. If no connection proxy is available, or the agent process does not otherwise provide a valid WAN address, the PCS process will set a special flag to indicate that the agent process is not available.

Figure 5:
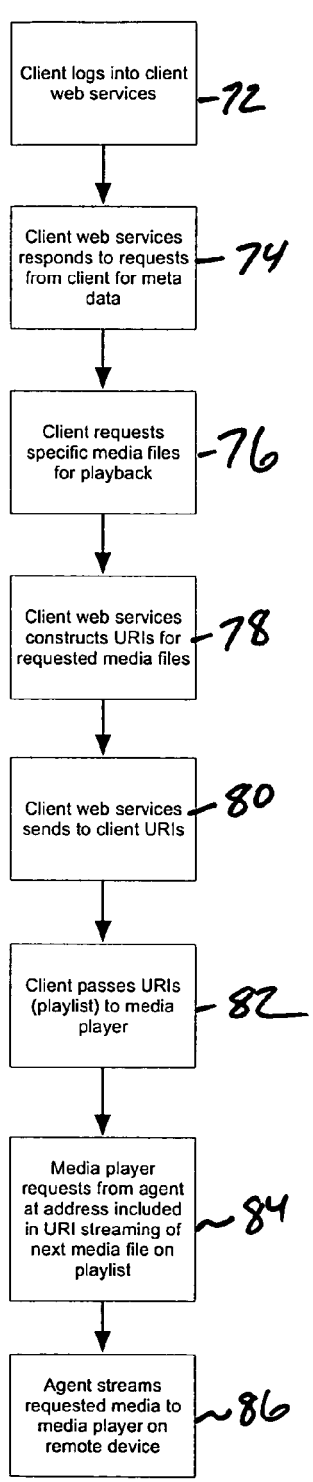
FIG. 5 is a exemplary process of a first embodiment of a client process.

Referring now to FIG. 5, with further reference to FIGS. 1 and 2, a client process in the illustrated example runs on a remote host, such as a computer, personal digital assistant, cellular telephone, or other consumer electronics devices. In the example, the remote host is connected or otherwise capable of communicating with an agent process 10 only through WAN 22. It also provides a media player on a remote device, such as media player 28 on remote device 20, with a URI for each of one or more media files that a user selects for streaming from agent process 10. The client process can, if desired, be incorporated into a media player. In given example, client web services function (1) to make available metadata for the media to a remote playback client, and (2) to provide to a remote playback client the current URIs for media files located by the agent on a host or local area network.

At step 72 the client process authenticates with client web services process 16 in order for the client process to receive media file information or metadata that the user is authorized to receive. This will include, for example, information on the user's collections. However, it might also include collections associated with other accounts, such as those of family members and friends, if those individuals have authorized the sharing of the information for the specific user account. In the present example, this information is stored in database 38. As represented by step 74, the user queries the client web services for information on the media files available to the user. This could be, for example, a search request for a list of all available media files or media files for a particular artist. It could also include information on all media files and playlists. This information is displayed to the user using a graphical user interface that, preferably, allows the user to sort the information. The user then specifies one or more media files for playback, either directly or as part of a playlist. At steps 76, the client process requests from the client web services http URIs for the media files in the playlist. Each URI is constructed at step 78 by the client web services using the current WAN address and port information provided by the agent process that had reported the availability of the request media file, and device, path and file name for the request media file. This information is sent to the client process at step 80. Alternatively, the client process may be provided the information and construct the URI's. Steps 74-80 can be taken and repeated anytime.

The client process passes the URI's at step 82 to the media player as, for example, a playlist. According to well-known processes, the media player uses http to request at step 84 streaming of each media file in the order specified in the playlist. The agent process transmits the file as a stream or "streams," each requested media file to the media player at step 86 in a form that permits immediate playback before the end of the media file is received. Steps 84 and 86 are repeated for each media file.

Figure 6:
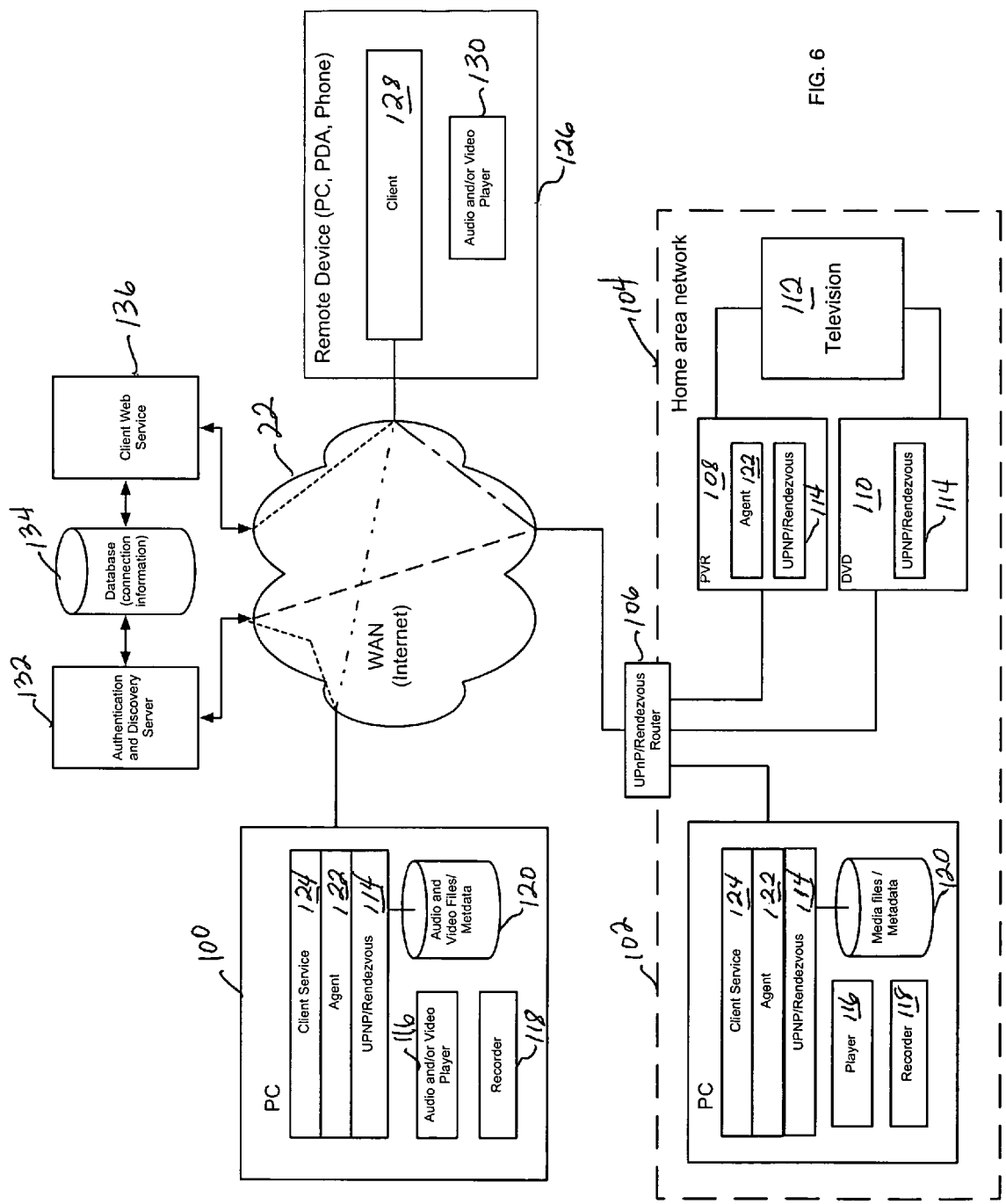
FIG. 6 is a block schematic representation of a second exemplary configuration of a network having processes for enabling playback of media files.

FIG. 6 represents an example using an alternate implementation of processes for enabling remote playback of media files. This example takes advantage of automatic network configuration protocols to provide greater flexibility and to reduce demands placed on the client web service process. In this example, personal computer 100, has a direct connection to WAN 22. It could also be connected through a firewall. Personal computer 102 is on a local or home area network 104 that connects to the WAN through a router 106 that provides network auto-configuration services using UPnP or Rendezvous. Also on home area network 104 is a personal video recorder (PVR) 108 and DVD player 110, each connected to television 112.

Personal computers 100 and 102, PVR 108 and DVD player 110 each preferably run software processes 114 for enabling automatic network configuration using, for example, UPnP or Rendezvous. However, not all of the devices on the home area network need this capability. Each of the personal computers, which are examples of host devices that run against processes and store media files, have audio and/or video player software 116 cable of playing media files stored on a computer or on portable media inserted into a portable media player, such as a CD or DVD driver. They also have media recorders 118. The media players and recorders are optional. Personal computers 100 and 102 also store media files and metadata 120. PVR 108 also stores media files, but these are not indicated in the figure.

Each host device in the example, namely personal computers 100 and 102 and PVR 108, runs an instance of agent process 122. Personal computers 100 and 102 also each run an instance of client services process 124. Remote device 126, which can be another personal computer, a PDA or a phone, runs an instance of client process 128 and a media player 130.

Authentication and discovery server (ADS) process 132 and client web services process 136 each run on or more server computers connected to WAN 22 and are connected with a database 134. Database 134 is simply intended to be representative of one or more databases, any one or all of which can be distributed. No particular form of database is meant or implied. Multiple instances of the PCS and client web services processes can run concurrently.

Figure 7:
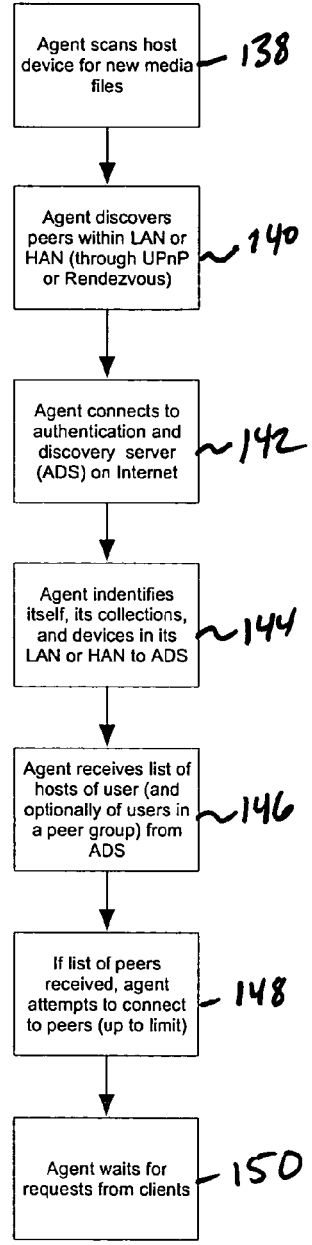
FIG. 7 is a flow diagram of certain exemplary steps of a second embodiment of an agent process in the network of FIG. 6.

Referring now also to FIG. 7 in addition to FIG. 6, when an instance of agent process 122 starts it creates and/or updates its catalog of media files available to it on its host device and, optionally, connected devices. These media files will be referred to as a collection. It scans at step 138 its host device and, optionally any connected devices such as connected drives, disc drives with portable media inserted, and portable players. The scope of the search or scan could be restricted to particular devices, volumes and/or directories, if desired.

The agent then attempts at step 140 to discover peers running on a local area or home area network. Peers are other instances of agent processes. Agents preferably implement a mechanism for publishing their services, such as UPnP or Rendezvous, to permit self-discovery. This discovery step can be repeated continually in order to discover new peers as they become available.

At step 142, the agent process then connects to ADS process 132 on WAN 22 and, at step 144, identifies itself, such as by providing a user or account identifier and a password. It also identifies it collections to the ADS process, but preferably does not upload metadata for all of the media content. Devices to which it is able to connect over a LAN or HAN, such as PVR 108 and DVD player 110, are also identified. This information is stored in database 134.

The ADS process then queries database 138 and returns to the agent process at step 146 a list of peers within the user's peer group. The list includes connection information, such WAN address and LAN address, to enable the agent process to connect to other instances of agent processes within the same peer group. Each these agent processes has registered with the ADS process and provided their connection information to the ADS process. In order to keep this information current, each agent process may contact the ADS process whenever connection information changes and/or periodically to confirm its availability and connection information. The ADS could also, if desired, try to connect, on some sort of regular or periodic basis, to each agent process that has registered with it, using the last WAN address given by the agent process, in order to confirm the agent processes' availability on the WAN. It is preferable not to have a persistent connection with each agent process in order to reduce the load on the ADS. However, such persistent connections could be used if desired. The peer group information may be limited only to those instances of the agent process that have registered with the ADS process using the same account. However, it may also include instances of the agent process that have registered with the ADS process using one or more other accounts. These other accounts may be, for example, friends who have given each other permission to access media files available through each other's accounts. These steps may be repeated as desired to update the peers that are available (e.g., logged in or out, or on or off line) or to update the information on the peers, such as connection information (e.g., network address).

At step 148 the agent process attempts to connect (if it is not already connected) to each peer agent process up to a predetermined number of them. It is preferred, but not necessary, to limit the number of connections to preserve resources. Instances of agents can connect to each other to form a distributed network of agents that, in effect, enables their collections to be combined and made available to client processes for searching and/or playback, even when one or more of them does not otherwise have a direct connection to the Internet. Once the connections are made, the agent process waits for requests for services (e.g., search requests for metadata or stream requests), as indicated by step 150.

Figure 8:
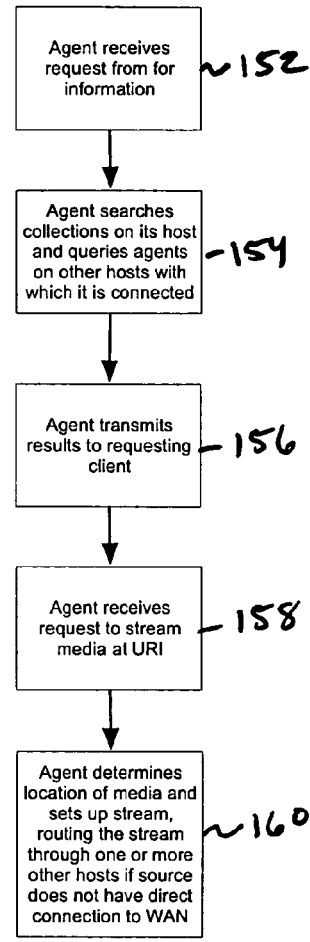
FIG. 8 is a flow diagram of certain additional exemplary steps of the second embodiment of the agent process.

FIG. 8 illustrates basic steps of an exemplary process in which an instance of an agent process provides services to a client process. Beginning at step 152, the agent process receives from a client process a request for information. For example, as indicated by step 154, this might be query or search request for metadata matching predefined criteria. The agent searches its own metadata files and, optionally, forwards the same or similar query to other agent instances to which it is connected. The query could be, for example, for all metadata records for audio files. It might also be for metadata records having data in an "artist" field matching a string provided by the client process. The query may also specify that only certain fields within the metadata be returned. Once the searches are performed, the matching metadata is transmitted to the client process requesting it, as indicated by step 156. The metadata that is returned will typically include the URIs, or information for constructing the URIs, for requesting a corresponding media file using, for example, hypertext transfer protocol (http). As indicated by step 158, the agent process receives the URI from a media player requesting streaming of a particular media file at the URI. If the media file is a file that the agent process has access to via its host (i.e., it is not stored on the host or on a device connected to the host), it routes the request to the instance of the agent process that reported having the media file and, if necessary, assists with routing the stream from the agent process to the client process requesting it if that agent process does not have a direct connection to the WAN, assuming that the instance of the client process requesting the stream is on the WAN and not on the same LAN as the agent process. For example, the one agent process with a direct connection to the WAN could serve to route the stream from another agent process to a client process on the WAN.

Agent processes and client processes may communicate with each other using proprietary standards, or to simplify development of implementations of client and/or agent processes by multiple different developers, open standards, such?????. For example, the World Wide Web Consortium's simple object access protocol (SOAP), as Microsoft's DCOM or .NET architecture, remote procedure call (RPC), or common object request broker architecture (CORBA).

Figure 9:
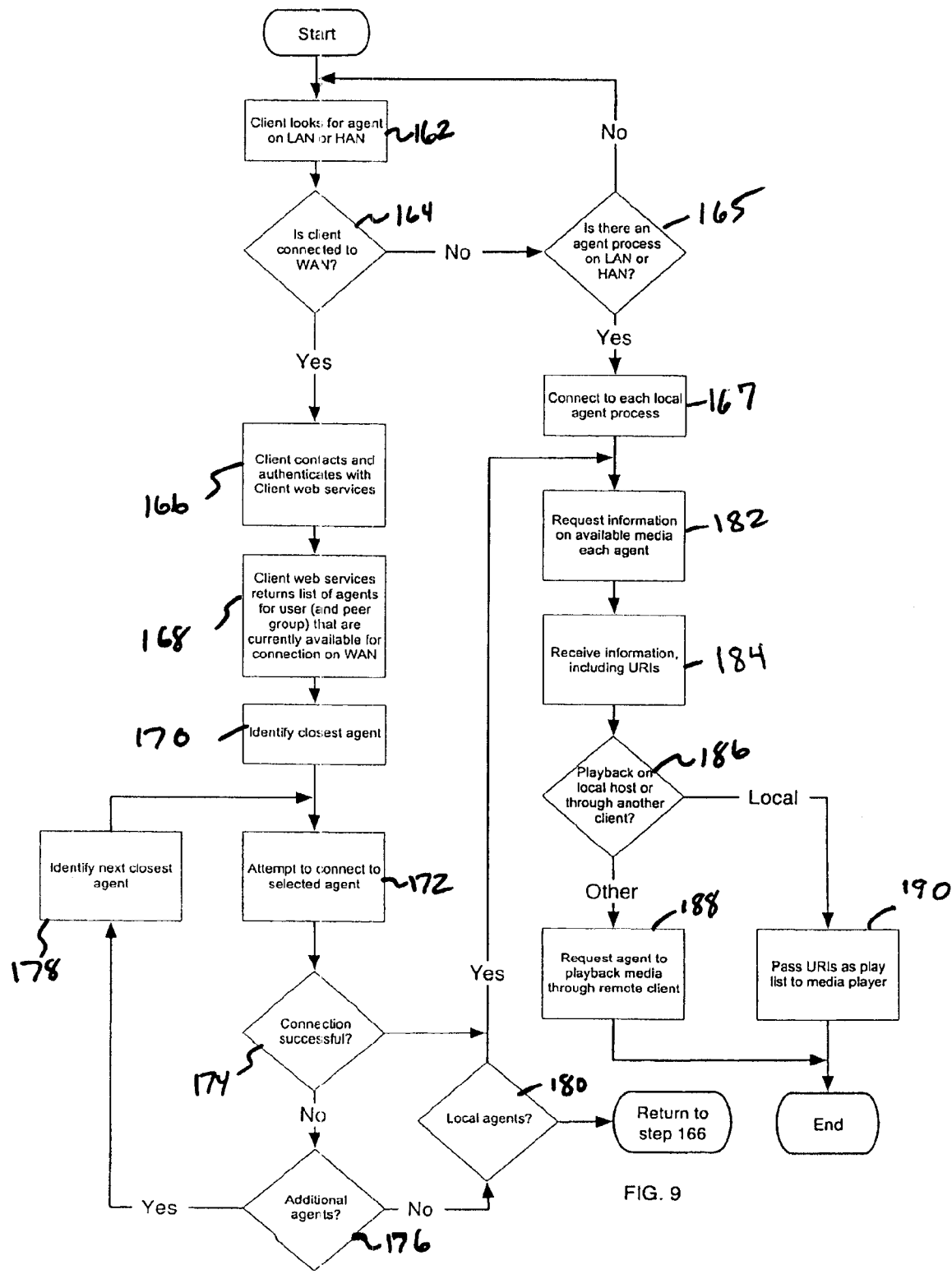
FIG. 9 is a flow diagram of exemplary steps of a second embodiment of a client process in the network of FIG. 6.

Turning to FIG. 9, which is an illustration of the basic steps of client process 128, an instance of client process 128 initially looks for agent process that may be available on its LAN or HAN. It preferably does this using UPnP, Rendezvous or similar automated networking protocol. As previously mentioned, agent processes preferably advertise their services using such a mechanism. The client process then determines whether it is connected to WAN 22 at step 164. If so, it continues to step 166. Otherwise, it goes to step 165. If there is no agent process available on the LAN or HAN, the client process returns to step 162 and continues to look for agent processes available on the LAN and WAN. If there are one or more agent processes, it connects to them at step 167.

If a connection to the WAN is available, the client process contacts and authenticates with client web services process 136 using a previously set-up account. Authenticating with the client web services process enables a client process to receive at step 168 WAN address information for connecting to instances of agent processes that have logged in with the ADS process, but preferably only those agent process to which that account has permission to access. Information on the agent processes may be limited to only those who have authenticated with the ADS process using the same account, or may include agent processes associated with accounts within a peer group. Thus, for example, an individual user will use his account with both an agent process running on the user's home computer and a client process running on a remote computer, such as a computer at the user's office. However, another user with a different account may have given him access to media files that are part of his collection, in which case information on agent processes that have logged in with the ADS process under this second user's account would also be given at step 168. Additional authentication mechanisms may also be used to ensure that a client process only connects to agent processes it has permission to connect to. These steps may be repeated as desired to find or receive updated connection information for agent processes available on the WAN.

Once connection information for agent processes is sent to the client process, the client process tries to identify what it believes to be the closest agent at step 170. This step is optional, thought it will assist with improving streaming performance of the media. Several different approaches can be taken to try to determine the closest agent process. Generally, an agent process with a low latency is preferred, though low jitter is probably more important for successful streaming. "Pinging" the agent process's IP address and measuring the elapsed time could be used to measure latency. Geographic information on IP address distribution could also be used, either as additional selection criteria or as the sole criterion. Connections with the agent process would likely be necessary to measure jitter, which would involve substantially more time.

The client process then attempts to connect with the selected agent process at step 172. As indicated by steps 174, 176 and 179, if a connection attempt fails, the client process loops and attempts to connect with next closest agent process, if any. If no agent processes can be found on the WAN, the client process may, if a local agent process is available, as indicated by step 180, proceed to step 182. Though it is not shown in the figure, the client process may contact the client web services process again to obtain any updated information on available agent processes.

At steps 182 and 184, the client process requests and receives information or metadata, including URIs, for media files available through the selected agent process, as described above in connection with FIG. 8. At step 182 and 184 the client process receives input from the user in terms of selection of media files for playback.

The client process preferably includes, as indicated by steps 186 and 188, an ability to have a stream played back through other instances of a client process that is connected to the agent process. The agent process shares with each client process an identification of each client service that is connected, if requested. If the agent process is requested to have another client process playback the media stream, the URI for each media file to be played back is passed to the selected client process, which then passes it to its associated media player. Otherwise, at step 190, the client process passes the URI (in the form of a playlist, for example) directly to the media player on the host, which then requests the agent process to send a stream containing the media file at the designated URI.

What is claimed is:

1. A method comprising:
collecting, at a first computing device, media content metadata and respective identifiers for individual media files of a plurality of media files that are available for a user experience at the first computing device and that are available to be communicated by the first computing device for experiencing at a second computing device;
receiving, at the first computing device from the second computing device, a request to receive the media content metadata and the respective identifiers for one or more individual media files of the plurality of media files;
communicating, from the first computing device to the second computing device, the media content metadata and respective identifiers for the individual media files of the plurality of media files available for a user experience at the first computing device to indicate that the individual media files of the plurality of media files are available for a user experience at the second computing device in response to a user-selection of one or more of the individual media files at the second computing device based at least in part on the media content metadata and/or the respective identifiers communicated to the second computing device;
receiving, at the first computing device, a request from the second computing device for a selected media file of the plurality of media files, the request to indicate that a user selection was made at the second computing device to experience the selected media file at the second computing device, the received request including a respective identifier for the selected media file; and
transmitting, from the first computing device, the selected media file to the second computing device as a stream.

2. The method of claim 1, wherein the respective identifiers for the individual media files comprise respective uniform resource identifiers.

3. The method of claim 1, further comprising:
communicating, to a remote server, a wide area network (WAN) address to be used to connect to the first computing device over the WAN.

4. The method of claim 3, further comprising:
determining whether a connection can be established via the WAN.

5. The method of claim 1, further comprising:
configuring a network address translation (NAT) router to receive communications from a wide area network (WAN).

6. The method of claim 1, further comprising:
automatically discovering other devices connected to the first computing device, the other devices having media files available for a user experience.

7. The method of claim 6, further comprising:
reporting to the remote server information on the discovered other devices connected to the first computing device.

8. The method of claim 6, further comprising:
receiving, by the first computing device, a request from one of the other devices for the first computing device to transmit a media file as a stream to the one of the other devices.

9. The method of claim 1, wherein said collecting the media content metadata and the respective identifiers for individual media files of the plurality of media files comprises searching the first computing device for media files and storing metadata about the located media files.

10. The method of claim 9, the searching for media files further comprising:
searching devices connected to the first computing device for media files.

11. A method comprising:
connecting, by a client process executing at a local computing device, to an agent process executing at a remote computing device;
transmitting, by the client process to the agent process, a request for media content metadata and respective identifiers for individual media files of a plurality of media files that are available for a user experience stored at the remote computing device;
receiving, by the client process executing at the local computing device from the agent process executing at the remote computing device, the media content metadata and respective identifiers for the individual media files of the plurality of media files, the received media content metadata and respective identifiers for the individual media files to indicate that the individual media files of the plurality of media files are available for a user experience at the local computing device, the received media content metadata and respective identifiers for the individual media files for use at the local computing device to request a selected media file from the plurality of media files, the selected media file to be experienced at the local computing device at least in part in response to a request for the selected media file that includes a respective identifier for the selected media file received with the media content metadata and the respective identifiers for the individual media files;
transmitting, from the local computing device to the remote computing device, the request for the selected media file; and
receiving, from the remote computing device, the selected media file as a stream.

12. The method of claim 11, wherein the respective identifiers for the individual media files comprise uniform resource identifiers (URI).

13. The method of claim 11, further comprising:
connecting, by the client process, over a wide area network (WAN) to a central server;
authenticating, by the client process, with the central server using an identifier associated with the agent process;
obtaining, by the client process from the central server, a WAN address for the agent process; and
connecting, by the client process, to the agent process using the WAN address.

14. A system comprising: at least one server to connect to a network, the at least one server further to:
store at least a portion of one or more messages received from a first computing device via the network, the one or more messages comprising media content metadata and respective identifiers for individual media files of a plurality of media files available for a user experience at the first computing device and to be made available by the first computing device for a user experience at a second computing device;
receive a request for the media content metadata and respective identifiers for the individual media files of the plurality of media files to be made available for a user experience at the second computing device from the second computing device via the network;

transmit the media content metadata and the respective identifiers for the individual media files of the plurality of media files to the second computing device via the network;

initiate streaming of a selected media file of the plurality of media files from the first computing device to the second computing device at least in part by transmitting, to the second computing device, information for the second computing device to make a request for the selected media file to the first computing device to stream the selected media file from the first computing device to the second computing device.

15. The system of claim 14, the at least one server further to:

obtain a network address of the first computing device; and transmit, to the second computing device, the network address of the first computing device and a respective identifier of the selected media file to the second computing device.

16. The system of claim 15, the network address and respective identifier of the selected media file to be used to form a universal resource identifier (URI) that is used to make the request for the selected media file.

17. The system of claim 16, the at least one server to obtain the network address at least in part by obtaining the information used to form the universal resource identifier from the first computing device.

18. A method comprising:

storing, by one or more servers connected to a network, at least a portion of one or more messages received from a first computing device via the network, the received one or more messages comprising media content metadata and respective identifiers for individual media files of a plurality of media files available for a user experience at the first computing device and to be made available by the first computing device for a user experience at a second computing device;

receiving a request for the media content metadata and respective identifiers for the individual media files of the plurality of media files to be made available for a user experience at the second computing device from the second computing device via the network;

transmitting the media content metadata and the respective identifiers for the individual media files of the plurality of media files to the second computing device via the network;

initiating streaming of a selected media file of the plurality of media files from the first computing device to the second computing device at least in part by transmitting, to the second computing device, streaming information for the selected media file to the second computing device, information for the second computing device to make a request for the selected media file to the first computing device to stream the selected media file from the first computing device to the second computing device.

19. The method of claim 18, further comprising:

obtaining a network address of the first computing device; and transmitting, to the second computing device, the network address of the first computing device and a respective identifier of the selected media file to the second computing device.

20. The method of claim 19, the network address and respective identifier of the selected media file to be used to form a universal resource identifier (URI) that is used to make the request for the selected media file.

21. The method of claim 20, wherein said obtaining the network address further comprises obtaining the information used to form the universal resource identifier from the first computing device.

22. An article, comprising: a computer-readable non-transitory storage medium having stored thereon instructions executable by one or more servers of a network to:

store at least a portion of one or more messages received from a first computing device via the network, the received one or more messages comprising media content metadata and respective identifiers for individual media files of a plurality of media files available for a user experience at the first computing device and to be made available by the first computing device for a user experience at a second computing device;

receive a request for the media content metadata and respective identifiers for the individual media files of the plurality of media files to be made available for a user experience at the second computing device from the second computing device via the network;

transmit the media content metadata and the respective identifiers for the individual media files of the plurality of media files to the second computing device via the network;

initiate streaming of a selected media file of the plurality of media files from the first computing device to the second computing device at least in part by transmitting, to the second computing device, information for the second computing device to make a request for the selected media file to the first computing device to stream the selected media file from the first computing device to the second computing device.

23. The article of claim 22, the storage medium having stored thereon further instructions executable by the one or more servers of the network to:

obtain a network address of the first computing device; and transmit, to the second computing device, the network address of the first computing device and a respective identifier of the selected media file to the second computing device.

24. The article of claim 23, the network address and respective identifier of the selected media file to be used to form a universal resource identifier (URI) that is used to make the request for the selected media file.

25. The article of claim 24, wherein the storage medium has stored thereon further instructions executable by the one or more servers of the network to obtain the network address at least in part by obtaining the information used to form the universal resource identifier from the first computing device.

26. A system comprising:

a first computing device connected to a network, the first computing device to:

identify media content metadata and respective identifiers for individual media files of a plurality of media files available for a user experience stored at the first computing device;

transmit, via the network, the media content metadata and respective identifiers for individual media files of the plurality of media files to a second computing device to indicate that the plurality of media files are available for a user experience at the second computing device;

receive a streaming request for a selected media file of the plurality of media files from the second computing device; and stream the selected media file to the second computing device via the network at least in part in response to receiving the streaming request.

27. A method comprising:
- identifying, by a first computing device connected to a network, media content metadata and respective identifiers for individual media files of a plurality of media files available for a user experience stored at the first computing device;
- transmitting, via the network, the media content metadata and respective identifiers for individual media files of the plurality of media files to a second computing device to indicate that the plurality of media files are available for a user experience at the second computing device;
- receiving a request for a selected media file from the second computing device; and
- streaming the selected media file to the second computing device via the network at least in part in response to receiving the request for the selected media file.

28. An article, comprising: a computer-readable non-transitory storage medium having stored thereon instructions executable by a first computer device connected to a network to:
- identify media content metadata and respective identifiers for individual media files of a plurality of media files available for a user experience stored at the first computing device;
- transmit the media content metadata and the respective identifiers for individual media files of the plurality of media files to a second computing device to indicate that the plurality of media files are available for a user experience at the second computing device;
- receive a request for a selected media file from the second computing device; and
- stream the selected media file to the second computing device via the network at least in part in response to receiving the request for the selected media file.

29. A system comprising: a second computing device connected to a network, the second computing device to:
- receive, via the network, media content metadata and respective identifiers for individual media files of a plurality of media files available for a user experience stored at a first computing device and made available by the first computing device for a user experience at the second computing device;
- transmit a request for a selected media file to the first computing device; and
- receive a stream of the selected media file from the first computing device via the network at least in part in response to transmitting the request for the selected media file.

30. A method comprising:
- receiving, by a second computing device via a network, media content metadata and individual identifiers for individual media files of a plurality of media files available for a user experience stored at a first computing device and made available by the first computing device for a user experience at the second computing device;
- transmitting a request for a selected media file to the first computing device; and
- receiving a stream of the selected media file from the first computing device via the network at least in part in response to transmitting the request for the selected media file.

31. An article, comprising: a computer-readable non transitory storage medium having stored thereon instructions executable by a second computing device connected to a network to:
- receive, via the network, media content metadata and identifiers for individual media files of a plurality of media files available for a user experience stored at a first computing device and made available by the first computing device for a user experience at the second computing device;
- transmit a request for a selected media file to the first computing device; and
- receive a stream of the selected media file from the first computing device via the network at least in part in response to transmitting the request for the selected media file.

* * * * *